Figure 1:
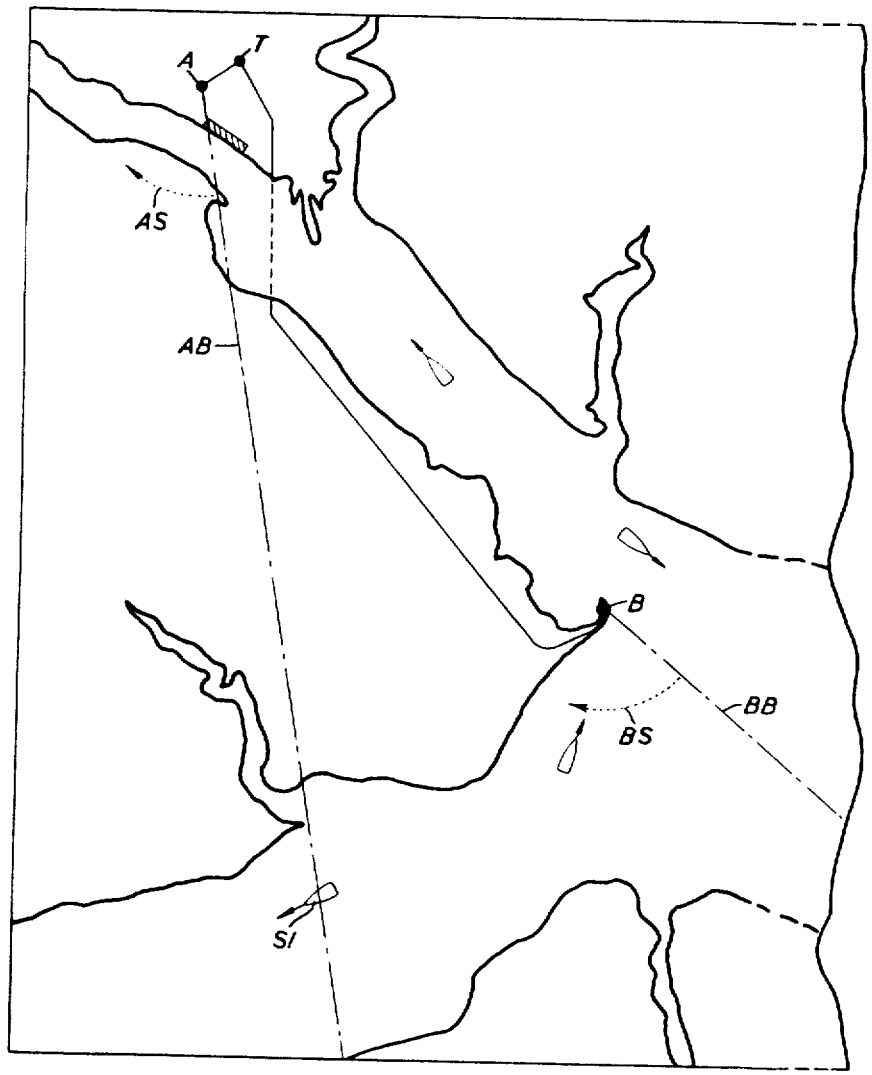

United States Patent Office 3,404,397
Patented Oct. 1, 1968

3,404,397
RADIO NAVIGATION AIDS
Victor James Cooper, Chelmsford, Essex, England, assignor to The Marconi Company Limited, London, England, a British company
Filed May 17, 1965, Ser. No. 456,233
13 Claims. (Cl. 343—6)

This invention relates to radio navigation aids and is at present primarily intended for marine use for ship harbour surveillance. As will be apparent later, however, it could be used for aiding air navigation and notably for airport control purposes. Although in the present specification, the invention will be particularly described in connection with its at present primary intended purpose, namely to ship navigation, it is not limited thereto and the word "harbour" is used herein, where the context admits, in a broad sense to include airports and their approaches as well as ship harbours and their approaches.

It is well known to provide harbours, estuaries and other local areas liable to be congested with craft, with high quality radar equipments, commonly called Harbour Surveillance Radars (hereinafter termed Harbour Radars) to enable the Harbour control officials to observe the movements of craft in the area surveyed and by radio telephone to assist the captains of such craft to navigate safely in conditions of bad visibility even though the craft in question—or some of them—may not themselves be equipped with radar. Such harbour radars usually have P.P.I. displays which include rotating line markers showing the changing momentary directions of the rotating directional aerials of the radars.

In order to make a harbour radar of greater service to craft in its area the P.P.I. picture it produces may be televised by a television camera and the resultant signals broadcast over the surveyed area so that craft therein may use simple and cheap television receivers to reproduce the P.P.I. picture obtained at the harbour radar station. Such televised P.P.I. pictures are obviously most helpful to the craft—especially to those not equipped with their own radars—but the information they provide still falls far short of safe navigational requirements in that they do not themselves provide means whereby the captain of any particular craft can identify it in the televised picture he receives. One way in which an individual craft could overcome this difficulty would be by performing some more or less complex manoeuvre—such as making a number of alterations of course and/or speed—and observing which of the craft representations in the televised picture executes the same manoeuvre, but obviously this is slow to practice, and often undesirable, or dangerous or even impractical. Other methods of overcoming the difficulty, proposed in United States Patent No. 2,528,202 for the navigation assistance of aircraft, is to transmit, by television, a Radar derived P.P.I. picture of the positions of aircraft in the area with, super-imposed thereon, a map of the service area and a rotating strobe line rotating in synchronism with rotating aerial of the Radar, receiving the televised picture by a television receiver in a co-operating aircraft and varying the brilliance of the picture either by receiving the radar pulses and integrating them to produce an integrated pulse which varies the brilliance or receiving a radar pulse and using it to trigger a multivibrator to produce a pulse at least as long as a television frame and applying the same to the grid of the television reproducer tube. A further proposal contained in the said Patent No. 2,528,202 consists in providing a ground station which scans the service area with a pulsed directional beam, re-transmitting the pulses from a radar beacon on a co-operating aircraft, receiving the re-transmitted pulses at the ground station incorporating them in a P.P.I. display there, transmitting from the ground station a television picture of the display including also a map of the service area and a strobe line rotating in synchronism with the scanning aerial producing the pulsed beam and receiving the televised picture in the aircraft, said aircraft having means for synchronously keying the re-transmitting beacon and the television receiver so that the representations of all aircraft in the received picture except that of the aircraft in question are caused to flicker. These proposals have, however, the defect of being complex and expensive and, moreover, if the after-glow in the television receiver tube is long enough to give a good television picture, the practical resolution i.e. the accuracy of identification of an individual target in the picture, will be well below that which is desirable to give safe identification of a particular target if there are (as there are apt to be in busy harbours) a number of them fairly close together.

The present invention seeks to provide simple, reliable and relatively cheap means whereby a craft equipped with a television receiver for receiving a televised radar display produced by an area surveying radar can readily identify itself in the picture with a degree of accuracy which is sufficient even in the case of ships in a busy harbour, the added shipborne means for this purpose being of a simple and economical nature.

According to the main feature of this invention a radio navigation aid for use on a moving vehicle comprises in combination a television receiver adapted to receive and reproduce a transmitted television picture of a display produced by an area surveying radar, said display including a marker indicative of the momentary direction of Radar transmission and indicating means responsive to the passage through said ship of the space scanning radio beam of said radar, and independent of the picture reproducing means for indicating the instant of said passage while leaving the reproduced picture unaffected.

The aforesaid responsive indicating means may be of the simplest and cheapest character—they may, indeed, comprise no more than a radio pulse receiver adapted to respond on reception of pulses from the surveying radar, and an indicator such for example as a small electric lamp, actuated by said pulse receiver and arranged to flash when said pulse receiver responds.

It will be seen that, with a navigation aid in accordance with this invention, it is necessary merely to observe, at the moment the indicator responds, the direction of the rotating line marker in the reproduced television picture and that this observation will in the great majority of cases identify the ship for in effect it will give the master his bearing from the harbour radar station. Moreover since the indicating means are independent of the picture reproducing means, good accuracy of bearing is obtained since after-flow effects in the picture reproducer do not affect the accuracy of bearing. In general this information will be sufficient, in practice, to enable a ship safely to identify itself in the televised picture. Although if there is more than one ship on the same bearing from the harbour station, their indicators will respond substantially at the same time, there will still be no ambiguity in identification if the said ships though on the same bearing, are heading in different directions, for each ship will know its own heading and, of course, an ordinary harbour radar display will give information as to ship headings from the directions of the "trails" or "tracks" behind the luminous dots representing the ships. The only source of ambiguity will therefore be that which occurs when there is more than one ship on the same bearing from the harbour radar station and in the same heading and even this will be a dangerous ambiguity only when the ships are in line ahead. It is not thought, however, that this source of ambiguity is likely in practice to cause serious navigational danger, for any ship receiving the televised picture will be aware therefrom that there is a second ship on the same bearing and heading and in line ahead and has only to determine whether the second ship is ahead or astern of her. This will usually be determinable in good time by methods of ordinary navigation and seamanship, e.g., listening for a fog whistle ahead or astern or in a harbour with varied depths, by taking soundings. If such methods are insufficient to resolve a dangerous ambiguity, an alteration of speed and/or course made before the ships are too close to one another, and observation of the resultant changes in the televised picture will normally do so. However the invention contemplates as an additional refinement, the provision of means whereby in addition to a position line constituted by the line of the ship's bearing from the harbour radar, a second position line, crossing the first at an angle, may be obtained for the purpose of unambiguous identification of the ship in the televised picture.

Preferably the indicator forming part of the indicating means, is movable mounted on a circular track positioned round the reproducer forming part of the television receiver, said indicator being movable along said track. This facilitates observation for craft identification, for the indicator can be simply moved along the track, following up the rotation of the rotating line marker in the television picture, until it gives an indication.

It will be obvious that, in carrying out this invention, care must be taken to ensure that the indicating means, responsive to the passage of the space scanning beam of the surveying radar shall not respond to space scanning beams from the radars of other craft which might be in the neighbourhood. This can readily be done by making the signals of the radar readily distinguishable from those of neighbourhood craft radars and making the aforesaid responsive means selectively responsive to the surveying radar signals. Thus in the case of a harbour installation, the harbour radar may have a carrier frequency or a pulse repetition frequency—preferably the former—widely different from the standard prescribed carrier frequency or pulse repetition frequency used for shipborne radars.

According to another feature of this invention a surveying radar station adapted for use in co-operation with vehicleborne radio navigation aids in accordance with the main feature of this invention comprises radar equipment adapted to scan a pre-determined area and to produce a P.P.I. display of said area, said display including an angularly moving marker moving in synchronism with the scanning directional aerial of said equipment, a television camera mounted and arranged to view said display, and a television transmitter adapted to broadcast over said area television signals utilisable for reproduction of said display, said radar equipment having at least one distinguishable operating characteristic whereby the signals it transmits can be readily distinguished from those transmitted from a normal vehicleborne radar transmitter. Preferably said distinguishable operating characteristic consists of the employment of a carrier frequency selectably different from that used for vehicleborne radar transmitters. In such a case the vehicleborne means responsive to the passage of the space scanning radio beam of the surveying radar will include means selectively responsive to the carrier frequency employed by said radar.

Where it is thought necessary to provide means for obtaining a second position line for the vehicle, said means may take any of a variety of different forms. Thus, for example, there may be provided an additional surveying radar transmitting aerial, geographically spaced from the main radar station and scanning the same surveyed area at the same speed as said station, means for utilising the echo signals produced by said main harbour radar station to produce a P.P.I. display of said area, means for televising the displayed picture and means for including in the television signals transmitted signals representative of two angularly moving markers, one swinging about the representation of the main radar station and the other swinging about the representation of the additional radar transmitting aerial in the display. Normally the signals representative of the marker swinging about the representation of the main radar station will be obtained simply by including that marker in the display. The signals representative of the other marker may be obtained in the same way but it is probably simpler to derive them separately and superimpose them on the television signals. A vehicle radio navigation aid for co-operation with such an equipment would comprise two indicators, one indicative of the passage of the scanning beam from the main radar station and the other indicative of the passage of the scanning beam from the additional radar transmitting aerial. In this way the vehicle would obtain in effect two bearings, one from the main station and the other from the additional aerial and thus be able to identify itself. In some cases it may be desirable to provide the additional aerial with its own transmitter having a recognisable different operating characteristic from that of the main station—e.g. a different carrier frequency—and to arrange the two indicators each to be selectively operable only by signals from the appropriate transmitter. In many cases, however, it will be possible so to arrange matters that this is not necesary, for by so choosing the geographical positions of the two surveying radar aerials and the angular relation of the scanning beam thereof that the beam from one aerial will pass through any vehicle in the area before the beam from the other and that the interval between the first and second passages is substantially smaller than (or alternatively substantially greater than) the interval between the second passage and the next following first passage, both indicators may be arranged to be responsive on both passages through the vehicle and the operator on the vehicle will nevertheless still know which of the two responses of the indicators corresponds to the first passage and which corresponds to the second and will be able, accordingly, to identify himself unambiguously from the two angularly swinging markers on his television picture.

In place of using an additional radar transmitting aerial as above described an angularly moving equi-signal radio beacon as known per se and geographically spaced from the main radar and moving at any convenient speed may be provided ashore and signals representative of a second angularly moving marker, indicative of the momentary direction of the said beacon, may be superimposed on the television signals transmitted either by superimposing them in known manner on the televised display produced by said main radar or by deriving them separately and superimposing directly on the television signals. In either case, of course, the signals representative of the second marker will be representative of a marker originating at the position of the beacon in the display. A co-operating vehicleborne radio aid would, in this case, include a first indicator indicative of the passage of the radar beam from the main station and a second indicator actuated in any well known manner to indicate the passage of the equi-signal.

In the foregoing description the effects of radio propagation times, the times taken by radar and equi-signal beam widths to move across a vehicle, and possible small time intervals between the production of a display by a surveying installation and the reproduction of the same display by a vehicleborne television receiver (such small intervals could occur due to the television transmitter lagging by a television frame or two) have been ignored. In practice, at any rate for ships this is permissible having regard to practical safe ship speeds in thick weather since the theoretical bearing and position errors which can occur from these causes will, in normal practice, be much too small to prevent the achievements of the object of the invention which is identification in a televised picture obtained by a surveying radar.

Figure 2:
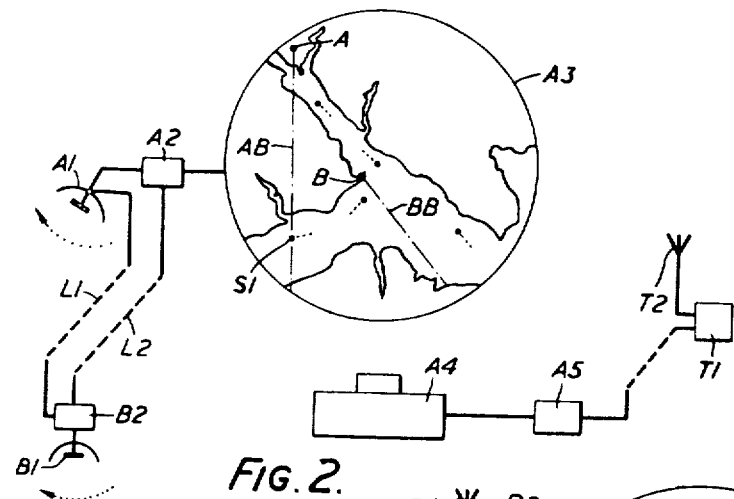
Figure 3:
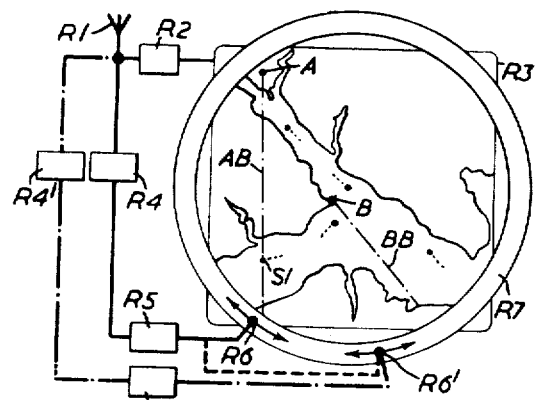
Figure 4:
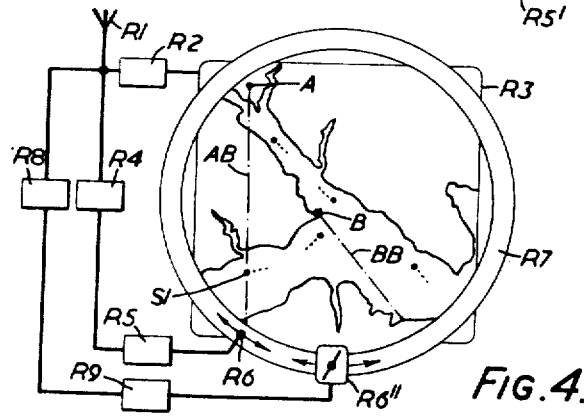

The invention is illustrated in the accompanying schematic drawings in which FIG. 1 serves to illustrate a number of different forms of harbour installation in accordance with the invention; FIG. 2 illustrates these installations in more detailed fashion; and FIGS. 3 and 4 illustrate forms of shipboard radio aids in accordance with the invention.

Referring to the drawings, FIG. 1 represents part of a harbour. At A is a harbour radar which surveys the harbour and its approaches by means of a rotating scanning directional radar beam represented by the chain line AB which rotates in the usual way at a constant pre-determined angular speed as indicated by the dotted curved arrow AS. The harbour radar produces a P.P.I. display of the surveyed area and the ships therein, the display having the usual line marker rotating in synchronism with the beam AB. The carrier frequency employed for the harbour radar is chosen at a value adequately different from the standardised carrier frequency used for shipborne radars to avoid confusion therewith. The P.P.I. display produced by the harbour radar is "viewed" by a television camera and transmitted from a television transmitter T situated at any convenient position and which broadcasts the displayed picture over the surveyed area on any convenient frequency and by ordinary television technique.

FIG. 2 is a schematic diagram which includes a representation of the installation at A and T. The harbour radar comprises the usual rotating directional scanning aerial A1 with which is associated a radar transmitter and receiver equipment A2 the video signal output from which is fed to a display cathode ray tube A3 to produce a radar display in the customary way. This display includes a rotating line marker (represented by a chain line AB) indicative of the momentary direction of the aerial A1. This line marker of course rotates about the point, in the display, corresponding to the geographical position of the aerial A1. In the particular arrangement envisaged in FIG. 1 this said point is offset, in well known manner, with respect to the centre of the display—it is actually quite close to the edge thereof—but obviously this is not necessary and the position of the said point may be chosen anywhere in the display in accordance with practical requirements and with due regard to the location and configuration of the waterways in the area to be surveyed.

The picture produced by the tube A3 is viewed by a television camera A4 whose video output, after suitable amplification at A5, is fed to a television transmitter T1 which may be situated at any convenient position, and which broadcasts the picture over the surveyed area by ordinary known television technique, from an aerial T2. Any television receiver receiving the television signals transmitted will therefore receive and reproduce a picture like that appearing on the screen of the tube A3.

Ships using the harbour installation as so far described are equipped with a television receiver capable of receiving the televised pictures from T and a simple indicator arrangement responsive when the radar beam AB encounters the ship. A simple but sufficient form of shipborne equipment is included in the representation in FIG. 3. It comprises a receiving aerial R1 which feeds into a television receiver R2 having a picture reproducer tube R3. The aerial R1 may be omni-directional or it may be broadly directional and orientable by hand. The aerial also feeds into a tuned selector circuit R4 which is selective of the carrier frequency of the harbour radar and which in turn feeds into a suitable pulse responsive detector and amplifier R5 adapted to provide an output sufficient to flash a gas discharge or other low consumption indicator lamp R6 each time a pulse is received from the harbour radar. If desired, in order to ensure more certain operation and reduce the liability to false operation by interfering signals, the unit R5 may also include a circuit selectively responsive to the recetpion of a sequence of pulses at the pulse repetition frequency of the harbour radar and a relay actuated by said repsonsive circuit and adapted when actuated, to flash the lamp R6. In the arrangement shown the lamp is mounted on a circular track R7 over the television reproducer tube screen so that it can readily be moved along the track. The track may be used as a connection to the lamp. In use the navigating officer merely pushes the lamp along the track, following the rotating marker AB, until it flashes. A line between the lamp and the representation of the harbour radar A in the picture then passes through the representation of the ship and thus identifies it. In FIGS. 2 and 3 the ship S1 is identified in this way.

If there are two or more ships on the same line but on different headings, observation of their headings as shown by the ship "trails" or "tracks" in the picture will be sufficient to identify "own ship" since its heading, will, of course, be known. If there are two ships abeam of one another on the same line and with the same headings and speeds there is, of course, no danger of collision and if the heading of one of them changes so that they close one another, identification inter se can be made in part from the changed heading of one of them and in part from the fact that the "trail" of the ship which has altered course will show a bend in it. If there are two ships abeam of one another on the same line and with the same headings but different speeds, identification inter se will be made as soon as one has drawn ahead of the other. The most dangerous possibility is when there are two or more ships in line ahead on the same bearing from the radar station. This possibly dangerous ambiguity will usually be resolvable by other navigational means, e.g. the taking of soundings, though in practice it will commonly be possible, in most harbours, so to arrange matters that it is unlikely to arise. Thus, for example, to take the harbour illustrated, ships leaving the harbour quayside—assumed to be near A—will normally be told, before they let go, whether other departing ships are ahead of them and/or will be informed of this on switching on their television by the picture given. In the illustrated case ships entering the harbour and on the same headings and in line ahead must be in or approaching the final fairway leading to the quayside and, before reaching their positions, will have had an opportunity when in the preceding fairway of identifying themsleves from the picture and, of course, once identification has been made the representation of a ship in the picture can be continuously watched to retain identification.

In order to facilitate the transfer (if required) of bearings from the radar picture to an ordinary chart of harbour plan the televised radar picture (FIG. 2) may have superimposed on it by known means one or more compass roses (not shown) including, preferably, a properly oriented compass rose centered on the position of station A, so that the rose or roses will be reproduced in the reproduced television picture (FIG. 3).

If it is thought necessary in any particular case to provide for elimination of ambiguity of identification as respects ships with the same heading and on the same bearing from the harbour radar station, a second geographically spaced harbour radar station may be provided. In the simplest case this second station may consist merely of a rotating transmitting aerial fed from the transmitter at the main station. This is also represented in FIGS. 1 and 2 where a second harbour radar B, tied or "slaved" to station A, is shown in FIG. 1 while FIG. 2 shows a second scanning radar aerial B1 with associated radar transmitting equipment B2. As already stated, however, the equipment B2 may be dispensed with and the aerial B1 may transmit the same signals, derived from the same source, as aerial A1. Station B provides the scanning radar beam represented by the chain line BB and rotating, at the same angular speed as beam AB, as indicated by the dotted curved arrow BS. The linking of the two beams is represented schematically by the lead L1 in FIG. 2. A rotating marker, representative of the momentary direction of the beam BB is produced in known manner and superimposed on the picture produced at station A, having, of course its origin at B in said picture. Alternatively, instead of superimposing the marker on the picture of A signals representative of such a marker may be produced in known manner and suitably superimposed on the television signals transmitted from T1. With either of these expedients the picture obtained in a co-operating ship will be a P.P.I. picture showing the harbour, with its ships, and two rotating markers one rotating about the representation of A in the picture and the other rotating about the representation of station B.

In many cases—for example that illustrated—it will not be necessary to provide different carrier frequencies or other different characteristics to distinguish stations A and B from one another. In the illustrated example it will be seen that beam AB will pass through any ship in the area before beam BB and the interval between these passages will be much less than the interval between the passage of BB and the next passage of AB. In these circumstances it will therefore be sufficient, in the shipboard installation, to provide a second indicator lamp R6' on the track R7 and operate it from unit R5 as shown dotted in FIG. 3. Both lamps will flash together twice, in fairly quick succession, with an observably longer interval before they next flash again. One lamp is moved to follow up the marker line from A until the first of two closely spaced successive flashes occurs and the second lamp is moved to follow up the marker line from B until the second of the two successive flashes occurs.

If it is necessary, or preferred, to distinguish between the signals from A and B different carriers may be employed. This will, of course, involve the provision of a separate transmitter at B. In this case the shipboard equipment would include, as shown in chain line connection in FIG. 3, a second selecting circuit R4' selective of station B and operating, through a unit R5' corresponding to R5, the second indicator lamp R6'.

Instead of a second harbour radar transmitting aerial, it may be more economical to provide a rotating radio equi-signal beacon as well known per se. FIGS. 1 and 2 serve to illustrate this also. With this modification, in FIG. 1 station B would be an equi-signal beacon and the line BB would represent the momentary direction of the equi-signal line. In this case the rotation of the equi-signal line from B need not be tied to the rotation of the radar beam from A because there is no problem of mutual interference. In this case, as in the case where a second rotating radar aerial is employed any position error likely in practice to arise because of movement of the ship between the passage therethrough of the two directional shore transmissions will be negligible. Signals representative of the momentary position of line BB are obtained in any convenient known manner and superimposed in known manner either on to the signals fed to tube A3 (FIG. 2) or on the television signals transmitted from T (FIG. 1) so that the picture reproduced in a co-operating ship includes the rotating equi-signal line BB as well as the rotating line AB.

In a co-operating shipboard installation, one example of which is represented in FIG. 4, the signals from the equi-signal beacon received on the aerial are amplified by a carrier amplifier R8 and fed to any known form of equi-signal detector R9 operating an equi-signal indicator R6" which is indicated as of the well known type comprising a pointer which takes up a central position in the equi-signal reception condition but swings over to one side or the other when one or other of the two beacon signals which combine to make the equi-signal is dominant. This indicator R6" is mounted on the track R7 and is moved round, following line BB, until it gives the equi-signal indication. Although, for the sake of clarity in the drawing, the indicator R6" is shown as of the swinging needle type, it is a simple matter and would probably be more convenient to arrange this indicator to be also a lamp which would light when the equi-signal line passed through the ship.

Obviously, if preferred, the two indicators (where two are provided) may run on separate concentric tracks which may be used also as indicator energising current connections to the indicators. Also, of course, separate aerials may be used for television signal reception and radar pulse or radio beacon signal reception as convenience and requirements of design may dictate.

I claim:

1. A navigation aid comprising radar means for transmitting and receiving radar pulses including a first scanning directional aerial for scanning a predetermined area, and a second scanning directional aerial geographically spaced from said first aerial for scanning substantially the same predetermined area, display means responsive to said radar means for producing a P.P.I. display of said area, said display means including means for producing a first angularly moving marker moving in synchronism with said first scanning directional aerial, television means for broadcasting said P.P.I. display including said first marker, and means for providing a second angularly moving marker in the broadcast P.P.I., said radar means having at least one distinguishable operating characteristic for distinguishing the transmitted signals of said radar means from normal vehicle borne radar transmitter signals.

2. A navigation aid according to claim 1 wherein said one distinguishable operating characteristic of said radar means comprises the employment of a carrier frequency selectively different from that used for vehicle borne radar transmitters.

3. A navigation aid according to claim 1 further including vehicle borne television receiving means including means for receiving and means for reproducing said broadcast P.P.I. including said first and second angularly moving markers, and vehicle borne indicating means, independent of said means for reproducing, responsive to the passage of transmitted radar pulses through the vehicle for indicating the instant of such passage while leaving the reproduced picture unaffected.

4. A navigation aid according to claim 3 wherein said indicating means comprises a radio pulse receiver adapted to respond on reception of pulses from said radar means, and an indicator actuated by said pulse receiver.

5. A navigation aid according to claim 4 wherein said indicator is movably mounted on a circular track positioned around said means for reproducing, said indicator being movable along said track.

6. A navigation aid according to claim 3 wherein said vehicle borne means responsive to the passage of radar pulses through the vehicle includes means selectively responsive to the carrier frequency employed by said radar means.

7. A navigation aid according to claim 1 wherein said means for providing a second angularly moving marker produces said second angularly moving marker in the P.P.I. produced by said display means responsive to said radar.

8. A navigation aid according to claim 1 wherein said means for providing a second angularly moving marker separately derives signals representative of said second angularly moving marker and superimposes said signals on signals broadcast by said television means.

9. A navigation aid according to claim 3 wherein said vehicle borne indicating means comprises first and second indicators, said first indicator being responsive to the passage of radar pulses from said first scanning directional aerial through said vehicle for indication of such passage, and said second indicator being responsive to the passage of radar pulses from said second scanning directional aerial through said vehicle for indicating such passage.

10. A navigation aid according to claim 3 wherein said radar means comprises transmitter means electrically connected to said second scanning directional aerial for transmitting radar pulses having a recognizably different operating characteristic from the radar pulses transmitted by said first scanning directional aerial.

11. A navigation aid according to claim 9 wherein said first indicator is only responsive to radar pulses from said first scanning directional aerial and said second indicator is only responsive to radar pulses from said second scanning directional aerial.

12. A navigation aid comprising radar means for transmitting and receiving radar pulses including a scanning directional aerial for scanning a predetermined area, and an angularly moving equi-signal radio beacon geographically spaced from said scanning directional aerial, display means repsonsive to said radar means for producing a P.P.I. display of said area, said display means including means for producing a first angularly moving marker moving in synchronism with said scanning directional aerial, television means for broadcasting said P.P.I. display including said first angularly moving marker, and means for producing a second angularly moving marker in the broadcast P.P.I. indicative of the momentary direction of said beacon, said radar means having at least one distinguishable operating characteristic for distinguishing the transmitted signals of said radar means from normal vehicle borne radar transmitter signals.

13. A navigation aid according to claim 12 including ship borne television receiver means comprising means for receiving and means for reproducing a transmitted television picture of said P.P.I. display, first indicator means responsive to the passage of radar pulses from said scanning directional aerial through said vehicle for indication of such passage, and second indicator means responsive to the passage of radio signals from said equi-signal radio beacon through said vehicle for indication of such passage.

References Cited

UNITED STATES PATENTS

| 2,528,202 | 10/1950 | Wolff | 343—6 |
| 3,298,022 | 1/1967 | Smith | 343—112 |

FOREIGN PATENTS

| 823,406 | 11/1959 | Great Britain. |

RODNEY D. BENNETT, *Primary Examiner.*

B. L. RIBANDO, *Assistant Examiner.*